US012009196B2

(12) United States Patent
Harada et al.

(10) Patent No.: US 12,009,196 B2
(45) Date of Patent: Jun. 11, 2024

(54) IONIZER

(71) Applicant: SHIMADZU CORPORATION, Kyoto (JP)

(72) Inventors: Takahiro Harada, Kyoto (JP); Yuichi Kuratani, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 383 days.

(21) Appl. No.: 17/596,458

(22) PCT Filed: Jul. 1, 2019

(86) PCT No.: PCT/JP2019/026104
§ 371 (c)(1),
(2) Date: Dec. 10, 2021

(87) PCT Pub. No.: WO2021/001887
PCT Pub. Date: Jan. 7, 2021

(65) Prior Publication Data
US 2022/0310376 A1 Sep. 29, 2022

(51) Int. Cl.
*H01J 49/10* (2006.01)
*H01J 49/04* (2006.01)

(52) U.S. Cl.
CPC .......... *H01J 49/0409* (2013.01); *H01J 49/10* (2013.01)

(58) Field of Classification Search
CPC ....... H01J 49/0409; H01J 49/10; H01J 49/164
USPC ......................................... 250/281, 282, 288
See application file for complete search history.

(56) References Cited

U.S. PATENT DOCUMENTS 5,965,884 A 10/1999 Laiko et al.
9,171,708 B1 * 10/2015 Doroshenko ....... H01J 49/0004

OTHER PUBLICATIONS

Notice of Allowance dated Jul. 19, 2022 issued for the corresponding Japanese Patent Application No. 2021-529568.
International Search Report for PCT/JP2019/026104, dated Sep. 10, 2019 (PCT/ISA/210).
Written Opinion of the International Searching Authority for PCT/JP2019/026104, dated Sep. 10, 2019 (PCT/ISA/237).

* cited by examiner

*Primary Examiner* — Michael Maskell
(74) *Attorney, Agent, or Firm* — Sughrue Mion, PLLC

(57) ABSTRACT

An ionizer 1 detachably attached to a main body 2 of an ion analyzing device includes an ionization section 10 including a sample stage 14 and light irradiation units 11, 12, and 13 configured to irradiate a sample placed on the sample stage 14 with light, a base body, and a movably-holding mechanism which is provided on the base body and configured to hold the ionization section in a manner movable or rotatable about one or more axes.

8 Claims, 4 Drawing Sheets

IONIZER

CROSS REFERENCE TO RELATED APPLICATIONS

This application is a National Stage of International Application No. PCT/JP2019/026104 filed Jul. 1, 2019.

TECHNICAL FIELD

The present invention relates to an ionizer.

BACKGROUND ART

One of methods for ionizing a sample that are used in a mass spectrometer is a laser desorption/ionization (LDI) method. The laser desorption/ionization method is a method in which a sample is irradiated with laser light, and sample molecules are excited and ionized by the energy of the laser light. An ionizer that ionizes sample molecules by the LDI method is called an LDI device.

Further, one of the laser desorption/ionization methods is a matrix assisted laser desorption/ionization (MALDI) method. In the matrix assisted laser desorption/ionization method, a substance (matrix material) that easily absorbs laser light and is easily ionized is mixed to a sample (or applied to a surface of a sample), so that the matrix material incorporates sample molecules. The matrix material incorporating the sample molecules is microcrystallized, which is irradiated with laser light, and the sample molecules are ionized. An ionizer that ionizes sample molecules by the MALDI method is called a MALDI device.

The LDI device and the MALDI device include a light irradiation unit including a laser light source and a condensing optical system which condenses laser light emitted from the laser light source and irradiates a sample, a sample stage on which the sample is placed, a sample stage moving mechanism which moves the sample stage, and an observation device for checking a state of a sample surface. Some LDI devices and MALDI devices can easily ionize sample molecules in an atmospheric pressure atmosphere (i.e. without evacuation), and ions generated by such LDI devices and MALDI devices are introduced into a main body of a mass spectrometer through an ion introduction port provided in the main body of the mass spectrometer and subjected to mass spectrometry (for example, Patent Literature 1).

CITATION LIST

Patent Literature

Patent Literature 1: U.S. Pat. No. 5,965,884 A

SUMMARY OF INVENTION

Technical Problem

The measurement sensitivity of mass spectrometry in the mass spectrometer depends on the efficiency with which ions generated at an irradiation position of laser light on a sample surface pass through the ion introduction port. As the deviation between the irradiation position of the laser light on the sample surface and the position of the ion introduction port increases, the amount of ions introduced into the mass spectrometer main body (ion introduction efficiency) decreases, and the measurement sensitivity decreases. For this reason, high positional accuracy is required when the LDI device or the MALDI device is attached to the main body of the mass spectrometer. The ion introduction port provided in the main body of the mass spectrometer has a size of, for example, about 1 mm in diameter, and high positional accuracy of several hundred μm or less is required for attaching the LDI device and the MALDI device to the main body of the mass spectrometer.

Conventionally, attachment of the LDI device or MALDI device to a main body of a mass spectrometer is performed by a person, who holds an ionizer, arranges it to abut on an attachment surface of the main body, adjusts the position of the ionizer, and fixes the ionizer to the main body with a fixture such as a bolt. However, in a case where a high-performance/multifunctional LDI device or MALDI device is used, it often includes a large laser irradiation optical system, a sample stage, an observation mechanism and the like, and the size and weight of the LDI device or MALDI device is large. For this reason, there has been a problem that it is sometimes difficult to attach the LDI device or MALDI device to the main body of the mass spectrometer with high positional accuracy.

Here, the case where ions generated by the LDI method or the MALDI method are subjected to mass spectrometry is described as an example. However, the same problem as described above also occurs in a case where ions generated by these methods are subjected to mobility analysis.

An object of the present invention is to provide an ionizer that can be easily attached to a main body of an ion analyzing device with high positional accuracy.

Solution to Problem

The present invention made to solve the above problem is an ionizer detachably attached to a main body of an ion analyzing device, the ionizer including:

an ionization section including a sample stage and a light irradiation unit configured to irradiate a sample placed on the sample stage with light;

a base body; and a movably-holding mechanism which is provided on the base body and configured to hold the ionization section in a manner movable along or rotatable about one or more axes.

Advantageous Effects of Invention

The ionizer according to the present invention includes an ionization section having a sample stage and a light irradiation unit which irradiates a sample placed on the sample stage with light. Further, the ionizer includes a base body and a movably-holding mechanism which is provided on the base body and holds the ionization section movably along or rotatably about one or more axes. Owing to the movably-holding mechanism, the ionization section and the main body of the ion analyzing device can be precisely aligned. Therefore, the ionizer according to the present invention can be attached to the ion analyzing device in a simple manner and with high positional accuracy.

DESCRIPTION OF EMBODIMENTS

Figure 1:
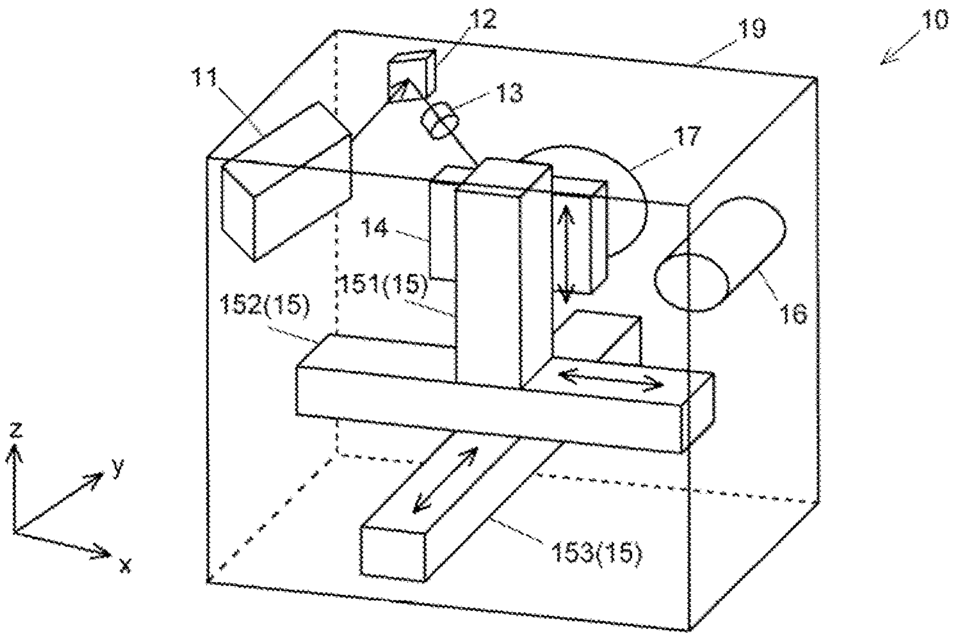
FIG. 1 is a diagram for illustrating a configuration of an ionization section in an embodiment of an ionizer according to the present invention.

An embodiment of an ionizer according to the present invention will be described below with reference to FIGS. 1 to 6. An ionizer 1 of the present embodiment is detachably attached to a mass spectrometer main body 2 as a part of MALDI-MS which generates ions by a matrix-assisted laser desorption/ionization (MALDI) method and performs mass spectrometry. In MALDI-MS, ions are generated at each of a plurality of measurement points on a surface of a sample placed on a sample stage and subjected to mass spectrometry. The mass spectrometer main body 2 is configured such that other ionizers such as an electrospray ionizer and an atmospheric pressure chemical ionizer can be attached in place of the ionizer 1 of the present embodiment described below. For this reason, the user can exchange the ionizer 1 which performs ionization by MALDI with another ionizer in a single mass spectrometer main body depending on the analysis application. Hereinafter, an embodiment in which the ionizer 1 which performs ionization by MALDI is attached to the mass spectrometer main body 2 will be described. In each diagram used in description below, in order to facilitate understanding, a size of a part of constituents is illustrated to be larger than an actual size.

An ionization section 10 of the ionizer 1 of the present embodiment includes an irradiation optical system including a laser light source 11, a reflecting mirror 12, and a condenser lens 13, and a housing 19 accommodating a sample stage 14, a stage moving mechanism IS, and a microscope 16. Further, an opening 17 is formed on one side surface of the housing 19. Among them, the laser light source 11, the reflecting mirror 12, the stage moving mechanism 15, and the microscope 16 are positioned in the housing 19.

FIG. 1 illustrates a configuration of the ionization section 10. Light emitted from the laser light source 11 is reflected by the reflecting mirror 12, and then condensed on a surface of a sample placed on the sample stage 14 located at a laser light irradiation position (front surface of the opening 17) by the condenser lens 13. Ions generated from the sample by the irradiation of the laser light are emitted from the opening 17 provided on the side surface of the housing 19 to the outside of the housing 19. The entire surface of the housing 19 is not necessarily covered, and the housing 19 may have a frame shape in which a part or the whole of the surface is opened. However, it is preferable that an attachment surface (ionization section side attachment surface) be provided on the attachment side with the mass spectrometer main body 2 in order to arrange a protrusion 18 to be described later.

The sample stage 14 is movable in three directions orthogonal to each other by the stage moving mechanism 15. The stage moving mechanism 15 includes a linear guide 151 for moving the sample stage 14 in a vertical direction (z direction), a linear guide 152 for moving the sample stage 14 and the linear guide 151 in a horizontal direction (x direction), a linear guide 153 for moving the sample stage 14 and the linear guides 151 and 152 in a horizontal direction (y direction), and a stepping motor (not illustrated) as a drive source for moving them.

Further, the microscope 16 for observing a sample placed on the sample stage 14 is provided in the housing 19, and a measurement target region on a sample surface is determined by moving the sample stage 14 to an observation position (front of the microscope 16) and observing the sample surface with the microscope 16.

Figure 2:
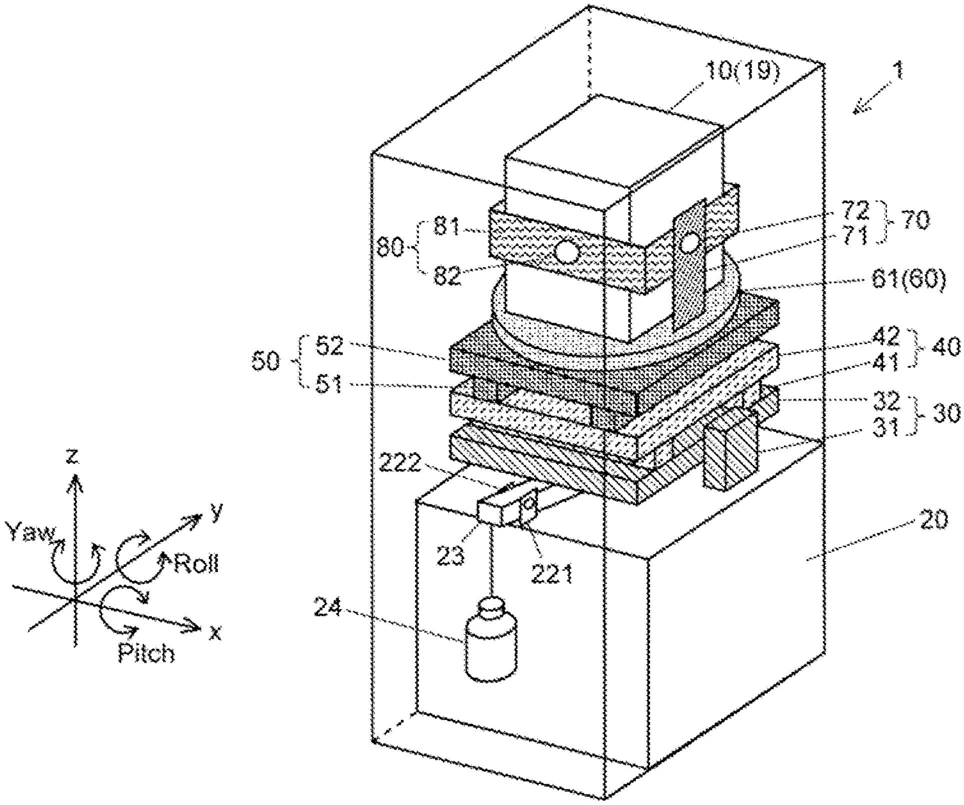
FIG. 2 is a diagram illustrating an internal configuration of the ionizer of the present embodiment.
Figure 3:
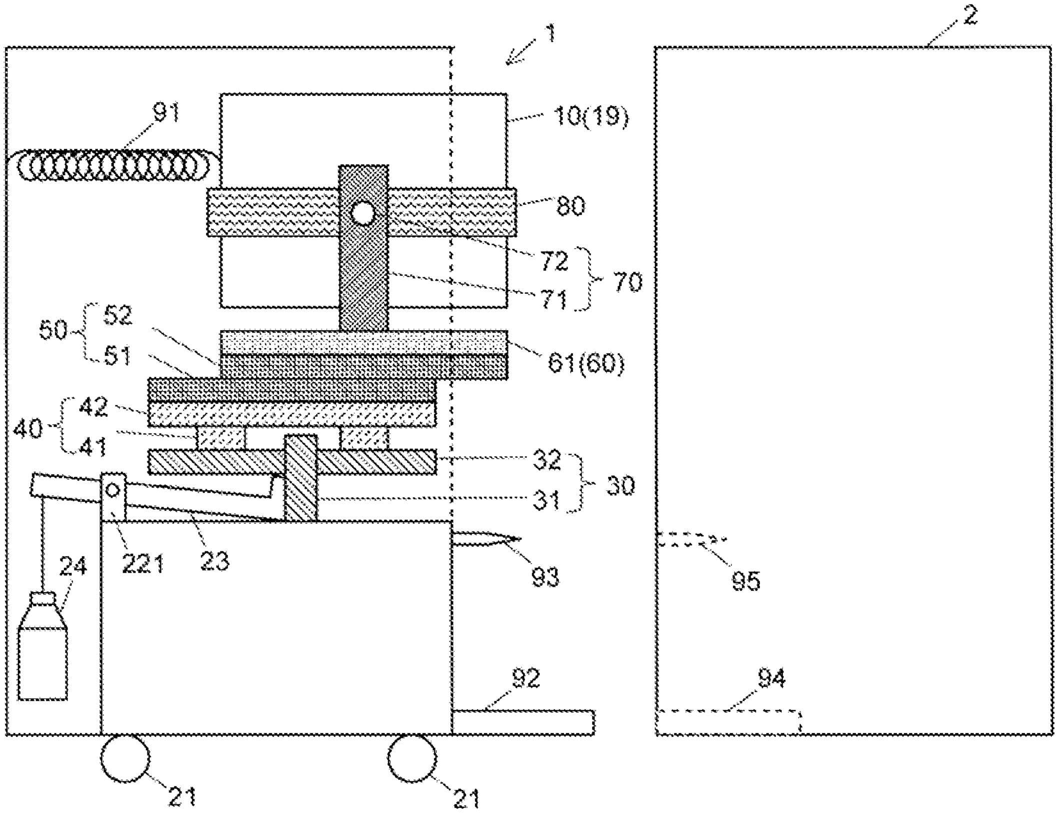
FIG. 3 is another diagram illustrating the internal configuration of the ionizer of the present embodiment.

The housing 19 of the ionization section 10 is rotatably and movably held in the ionizer 1. As shown in FIGS. 2 and 3, the ionizer 1 includes a base 20, a vertical moving mechanism 30, a first horizontal moving mechanism 40, a second horizontal moving mechanism 50, a first rotating mechanism 60, a second rotating mechanism 70, and a third rotating mechanism 80, and the ionization section 10 is held by each of these mechanisms so as to be rotatable and movable in each direction. That is, these mechanisms correspond to a movably-holding mechanism in the present invention. Further, the base 20 corresponds to a base body in the present invention.

The ionizer 1 is accommodated in a rectangular parallelepiped housing having an openable and closable upper surface, a bottom surface, and three side surfaces, and a side surface on which the mass spectrometer main body 2 is attached is open. The left diagram of FIG. 3 is a diagram illustrating an internal configuration of the ionizer 1, and the right diagram of FIG. 3 is a diagram illustrating a part of a configuration of the main body 2 of the mass spectrometer. As a mass spectrometry section accommodated in the main body 2 of the mass spectrometer, an appropriate mass spectrometer according to a purpose of measurement among various conventionally known mass spectrometers is used.

A caster 21 (not illustrated in FIG. 2) is attached to a bottom surface of the base 20. Two plate-shaped members 221 and 222 are erected in parallel on a peripheral edge portion of one side of an upper surface of the base 20. One point of a long side of an L-shaped member 23 is fixed between the plate-shaped members 221 and 222. A weight 24 is attached to an end portion of the long side of the L-shaped member 23, an intersection of the long side and a short side is located on an upper surface of the base 20, and an end portion of the short side abuts on a lower surface of a plate-shaped member 32 (described later) of the vertical moving mechanism 30. With a fixing point (point fixed to the plate-shaped members 221 and 222) of the L-shaped member 23 as a fulcrum, the weight 24 is configured to be balanced with the weight of the ionization section 10 and each mechanism described above by the principle of leverage. In this manner, the housing 19 of the ionization section 10 can be smoothly rotated and moved regardless of the weight of the ionization section 10 or each mechanism.

A vertical moving mechanism 30 including two linear guides 31 extending in the vertical direction (z direction) and the plate-shaped member 32 moving along the linear guides 31 is provided on the upper surface of the base 20.

The first horizontal moving mechanism 40 including two linear guides 41 extending in the horizontal direction (x direction) and a plate-shaped member 42 moving along the linear guides 41 is provided on the plate-shaped member 32 of the vertical moving mechanism 30.

The second horizontal moving mechanism 50 including two linear guides 51 extending in the horizontal direction (y direction) and a plate-shaped member 52 moving along the linear guides 51 is provided on the plate-shaped member 42 of the first horizontal moving mechanism 40.

On the plate-shaped member 52 of the second horizontal moving mechanism 50, a rotary table 61 rotatable in a horizontal plane is arranged. Plate-shaped members 71 are erected at two locations in a peripheral edge portion of an upper surface of the rotary table 61 with the center of the rotary table 61 interposed between them, and a frame-shaped member 81 is fixed to a fixation section 72 of the plate-shaped member 71. The frame-shaped member 81 is arranged so as to surround a side peripheral portion of the housing 19, and a side surface of the housing 19 is fixed to the fixation section 82. That is, the rotary table 61 constitutes the first rotating mechanism 60 which rotates (yaws) the housing 19 about a z axis (Yaw), the plate-shaped member 71 and the fixation section 72 constitute the second rotating mechanism 70 which rotates the housing 19 about an x axis (Pitch), and the frame-shaped member 81 and the fixation section 82 constitute the third rotating mechanism 80 which rotates the housing 19 about a y axis (Roll).

A biasing member (in the present embodiment, a spring 91, not illustrated in FIG. 2) which pushes the housing 19 of the ionization section 10 toward the mass spectrometer main body 2 is attached between a side surface of the ionization section 10 opposite to a side surface where the opening 17 is formed and an inner wall surface of the ionizer 1.

Figure 4:
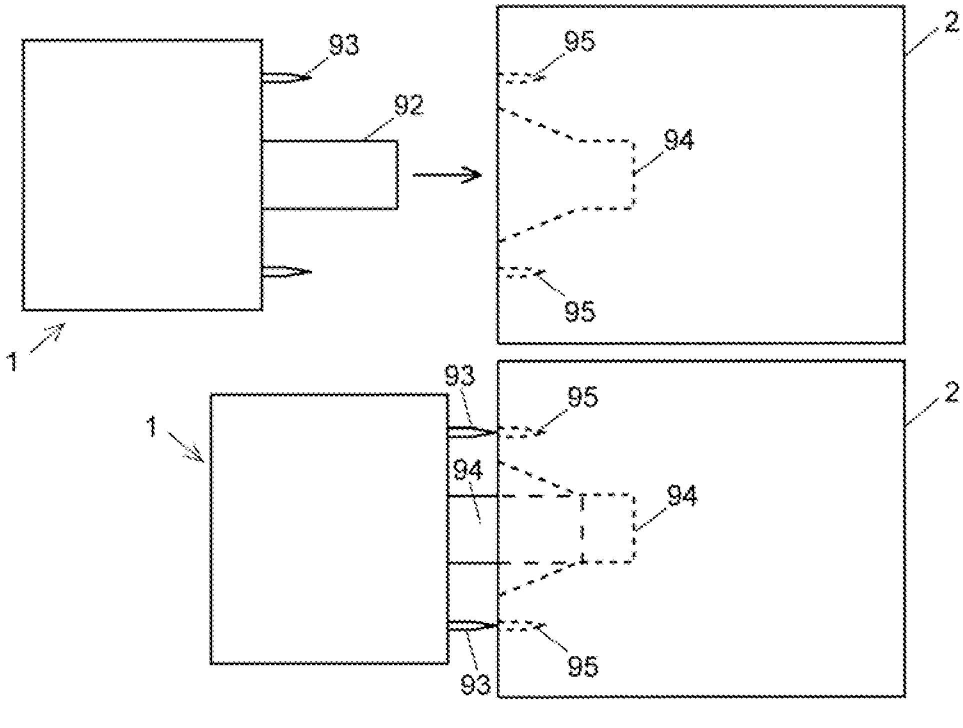
FIG. 4 is a diagram for explaining rough adjustment when the ionizer of the present embodiment is attached to the main body of the mass spectrometer.

The base 20 is provided with a plate-shaped member 92 protruding from a lower end of a side surface (surface on the side of the ionization section side attachment surface) of the base 20, and a bar-shaped member 93 having a tapered tip is attached to an upper portion of the same side surface of the base 20. On the other hand, a first insertion port 94 into which the plate-shaped member 92 is inserted and a second insertion port 95 into which the bar-shaped member 93 is inserted are provided on the side of a surface to which the ionization section 10 is attached (main body side attachment surface) of the mass spectrometer main body 2. As illustrated in FIG. 4, an inlet of the first insertion port 94 is formed to be wider than the plate-shaped member 92, and gradually narrows toward the back. In the present embodiment, the plate-shaped member 92 and the bar-shaped member 93 are provided on the base 20. However, one or both of them may be provided on the ionization section side attachment surface of the ionization section 10. In this case, the first insertion port 94 and/or the second insertion port 95 are provided on the main body side attachment surface of the mass spectrometer main body 2.

Figure 5:
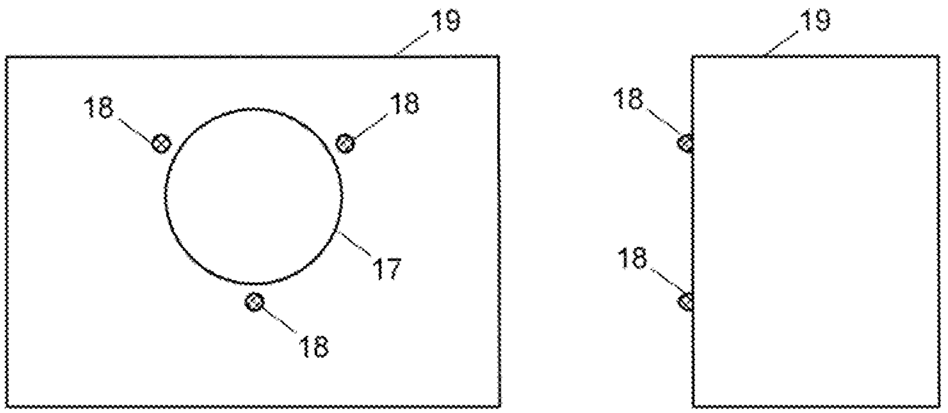
FIG. 5 is a diagram for illustrating a configuration of an attachment surface of the ionizer of the present embodiment.
Figure 6:
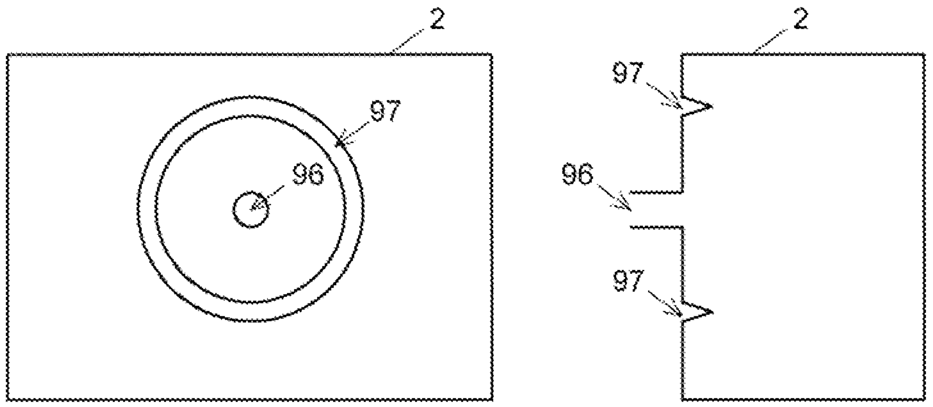
FIG. 6 is a diagram for illustrating a configuration of an attachment surface of the main body of the mass spectrometer to which the ionizer of the present embodiment is attached.

As illustrated in FIG. 5, three of the protrusions 18 are provided outside the opening 17 on the ionization section side attachment surface of the ionization section 10. As shown in FIG. 6, the main body side attachment surface of the mass spectrometer main body 2 is provided with a cylindrical ion introduction unit 96 and a circular V-shaped groove 97 around the ion introduction unit 96.

Next, a procedure for attaching the ionizer 1 of the present embodiment to the mass spectrometer main body 2 will be described.

First, a sample to be analyzed and a sample for calibration are placed on the sample stage 14, and the sample stage 14 is set in the stage moving mechanism 15 in the housing 19.

Next, the ionizer 1 is brought closer to the mass spectrometer main body 2, and the plate-shaped member 92 is inserted into the first insertion port 94. Since an inlet of the first insertion port 94 is wider than a width of the plate-shaped member 92, when the plate-shaped member 92 is inserted into the first insertion port 94, the plate-shaped member 92 can be inserted into the first insertion port 94 even if there is a slight positional deviation between the ionizer 1 and the mass spectrometer main body 2. When the ionizer 1 is brought close to the mass spectrometer main body 2 with the positional deviation, the plate-shaped member 92 is guided by the first insertion port 94, and the positional deviation between the ionizer 1 and the mass spectrometer main body 2 is eliminated. In this manner, for example, the positional accuracy of the attachment position of the ionizer 1 and the mass spectrometer main body 2 is reduced to about several mm.

When the ionizer 1 is further brought closer to the mass spectrometer main body 2, the bar-shaped member 93 is inserted into the second insertion port 95. The second insertion port 95 is configured to allow positional deviation of about several mm between the ionizer 1 and the mass spectrometer main body 2 (so that the tip of the bar-shaped member 93 is inserted into the second insertion port 95). When the ionizer 1 is brought close to the mass spectrometer main body 2 with the positional deviation, the bar-shaped member 93 is guided by the second insertion port 95, and the positional deviation between the ionizer 1 and the mass spectrometer main body 2 is further eliminated. In this manner, for example, the positional accuracy of the attachment position of the ionizer 1 and the mass spectrometer main body 2 is reduced to about 1 mm.

When the ionizer 1 is further brought closer to the mass spectrometer main body 2, the ion introduction unit 96 is inserted into the opening 17 formed on the ionization section side attachment surface, and subsequently, a tip of the protrusion 18 abuts on an inlet of the V-shaped groove 97 formed on the main body side attachment surface.

When the ionizer 1 is further brought closer to the mass spectrometer main body 2, the protrusion 18 enters the V-shaped groove 97. In this manner, the ionization section 10 can be attached to the mass spectrometer main body 2 with high positional accuracy of several hundred μm or less.

According to the above procedure, after the ionization section 10 is attached to the mass spectrometer main body 2, ions generated by irradiation of the sample for calibration on the sample stage 14 with laser light are detected. At that time, the condenser lens 13 is slightly moved to finely adjust the irradiation position of the laser light so that a detection intensity of the ions becomes maximum. In the present embodiment, since the ionization section 10 is attached to the mass spectrometer main body 2 with high positional accuracy of several hundred μm or less, fine adjustment of the irradiation position of the laser light only needs to be performed within a range of several hundred μm or less, and the irradiation position of the laser light can be easily adjusted to an optimum position.

Conventionally, when an ionizer such as the LDI device or the MALDI device is attached to a mass spectrometer main body, the user holds up the ionizer to cause the ionizer to abut on an attachment surface of the main body, adjusting an attachment position of the ionizer, and fixing the ionizer with a fixture such as a bolt. However, in order to improve the performance and multifunction of the ionizer, when the ionization section 10 having a configuration including a microscope for observing a sample surface in addition to an irradiation optical system for irradiating the sample surface with laser light as in the present embodiment is used, one side of the housing 19 is close to 1 m, and the weight may reach 10 kg. In the conventional method in which the user holds up the housing 19 of the large and heavy ionization section 10 to cause the housing 19 to abut on the attachment surface of the mass spectrometer main body, adjusts the attachment position, and fixes the ionization section with a fixture such as a bolt, it is difficult to attach the ionization section to the mass spectrometer main body with high positional accuracy. The diameter of the ion introduction unit provided in the mass spectrometer main body is usually about 1 mm in diameter, and when the attachment position of the ionizer is shifted by several hundred μm or more, even if a sample for calibration on the sample stage is irradiated with laser light at that position, no ion is detected, and the irradiation position of the laser light has to be adjusted by trial and error. In particular, in a case where the user himself/herself intends to replace the LDI device or the MALDI device with another ionizer such as an electrospray ionizer or an atmospheric pressure chemical ionizer using a single mass spectrometer main body and use the LDI device or the MALDI device, it is difficult to attach the LDI device or the MALDI device with high positional accuracy by the conventional method, and thus there has been a case where it is difficult to perform intended analysis after the replacement of the ionizer.

In contrast, in the ionizer 1 of the present embodiment, since the ionization section 10 is held so as to be rotatable and movable with respect to the base 20 of the ionizer, the ionization section 10 can be smoothly moved and rotated. For this reason, the ionizer 1 having a large size and a large weight can be easily attached to the mass spectrometer main body 2 with high positional accuracy. Further, when the ionizer 1 is moved by the caster 21 to approach the mass spectrometer main body 2, the plate-shaped member 92, the bar-shaped member 93, and the protrusion 18 are sequentially inserted into the first insertion port 94, the second insertion port 95, and the V-shaped groove 97, so that the ionization section 10 can be attached to the mass spectrometer main body 2 more simply, easily, and accurately. Furthermore, since the ionization section 10 is attached to the mass spectrometer main body 2 with accuracy of several hundred μm or less, ions generated from a sample for calibration placed on the sample stage 14 can be assuredly detected, and an irradiation position of laser light can be optimized only by finely adjusting the irradiation position of the laser light.

The above embodiment has a configuration in which, for easy understanding, the vertical moving mechanism 30, the first horizontal moving mechanism 40, and the second horizontal moving mechanism 50 for moving the housing 19 in three orthogonal directions, and the first rotating mechanism 60, the second rotating mechanism 70, and the third rotating mechanism 80 for rotating the ionization section 10 about three orthogonal axes are included. However, the rotation (Roll) around the y axis rotation within the plane of the attachment surface (ionization section side attachment surface) of the ionization section 10 and the attachment surface (main body side attachment surface) of the mass spectrometer main body 2, and when laser light is condensed at a position in front of the ion introduction unit 96 of the mass spectrometer main body 2, the rotation (Roll) around the y axis of the ionization section 10 does not affect the efficiency of introduction of ions from the ionization section 10 into the mass spectrometer main body 2. For this reason, it is possible to employ a configuration in which the rotating mechanism is omitted.

Further, as described above, as long as the plate-shaped member 92 of the ionizer 1 is inserted into the first insertion port 94, the ionization section 10 is attached to the mass spectrometer main body 2 with positional accuracy of about several mm. Therefore, it is not necessary to move and rotate the housing 19 of the ionization section 10 so much.

In view of these points, the configuration of the ionizer 1 of the above-described embodiment can be simplified. An ionization section 104) of another embodiment having such a configuration will be described below with reference to FIGS. 7 and 8. The constituents in the housing 19 of the ionization section 10 described with reference to FIG. 1, and the configurations of the ionization section side attachment surface of the ionization section 10 and the main body side attachment surface of the mass spectrometer main body 2 described with reference to FIGS. 5 and 6 are the same as those in the above embodiment, and therefore, illustration and description of them are omitted. Further, regarding other constituents, the same reference numerals are given to the last two digits or the last three digits of constituents similar to those in the above embodiment, and the description of them is appropriately omitted.

Figure 7:
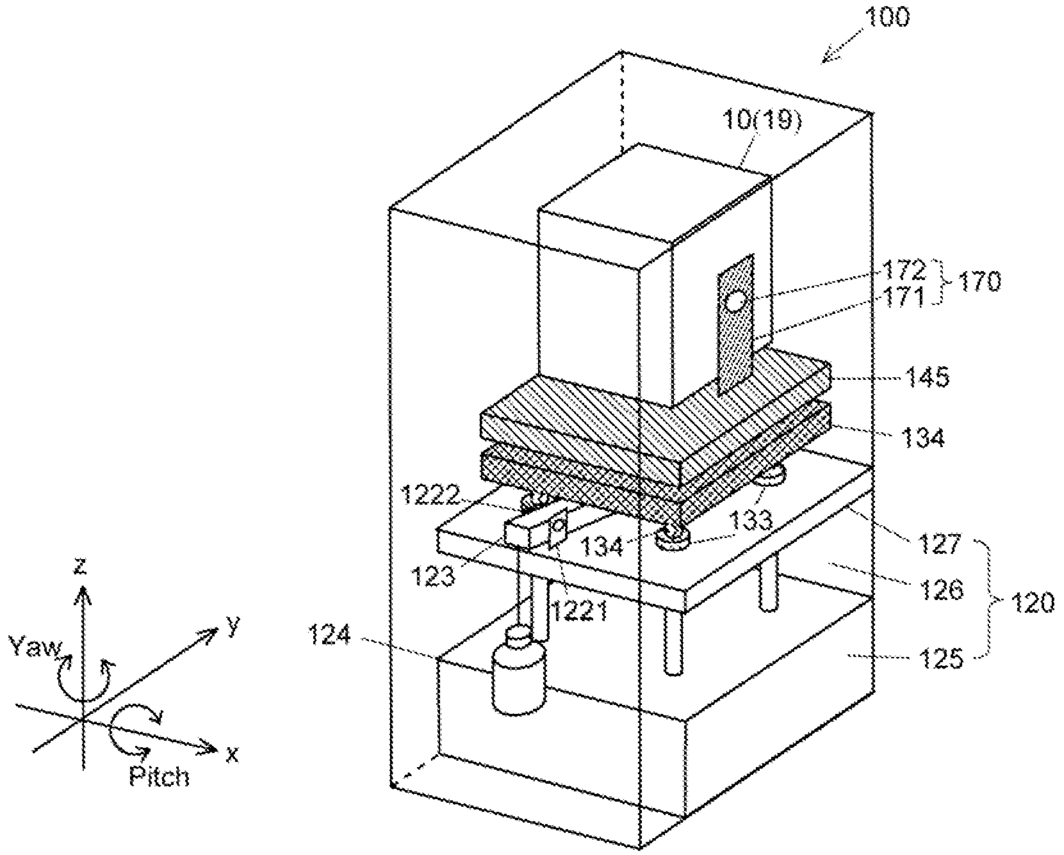
FIG. 7 is a diagram for illustrating the internal configuration of the ionizer of another embodiment.
Figure 8:
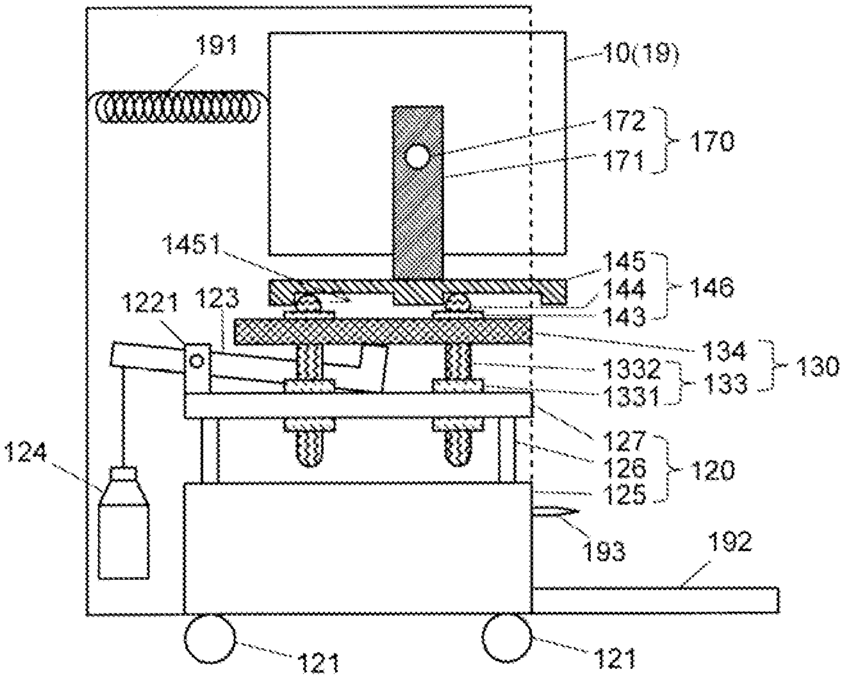
FIG. 8 is another diagram for illustrating the internal configuration of the ionizer of another embodiment.

As illustrated in FIGS. 7 and 8, the ionization section 100 includes a base 120, a vertical moving mechanism 130, a horizontally-movably-holding mechanism 146, and a rotating mechanism 170, and, by these, the housing 19 of the ionization section 10 is held so as to be movable and rotatable. Similarly to the above embodiment, a spring 191 (a biasing member, not illustrated in FIG. 7) which pushes the housing 19 is attached between a side surface of the housing 19 of the ionization section 10 where the opening 17 is formed and an inner wall surface of a housing of the ionizer 1.

The base 120 includes a lower base 125 and an upper base 127 fixed by four bar-shaped members 126 erected on an upper surface of the lower base, and a plate-shaped member 192 and a bar-shaped member 193 are provided on a side surface (a surface on the side of the ionization section side attachment surface) of the lower base 125. A caster 121 (not illustrated in FIG. 7) is attached to a bottom surface of the lower base 125.

Two plate-shaped members 1221 and 1222 are erected in parallel in a peripheral edge portion of an upper surface of the upper base 127. One point of a long side of an L-shaped member 123 is fixed between the plate-shaped members 1221 and 1222. A weight 124 is attached to an end portion of the long side of the L-shaped member 123, an intersection of the long side and a short side is located on an upper surface of the upper base 127, and an end portion of the short side abuts on a lower surface of a plate-shaped member 134 (described later) of the vertical moving mechanism 130.

A linear bush 133 is attached to four corner portions of the upper base 127. The linear bush 133 is a linear motion mechanism configured by a combination of a cylindrical member 1331 in which a plurality of hard balls are rotatably arranged on an inner wall surface and a shaft 1332 inserted into the cylindrical member, and is also called a slide bush or a ball bush. A plate-shaped member 134 is fixed to an upper end portion of each of the linear bushes 133. The linear bush 133 functions as the vertical moving mechanism 130 which moves the plate-shaped member 134 and the ionization section 10 and the like arranged on an upper portion of the plate-shaped member 134 in the vertical direction.

A receiving portion 143 having a recessed upper surface is fixed to four corners of an upper surface of the plate-shaped member 134, and a ball member (hard ball) 144 is rotatably accommodated in the receiving portion 143. Another plate-shaped member 145 is arranged above the plate-shaped member 134 of the vertical moving mechanism 130. A recess 1451 is formed at a position corresponding to an upper portion of the position of the ball member 144 on a lower surface of the plate-shaped member 145, and the plate-shaped member 145 is movable on a horizontal plane by the rotation of the ball member in the recess 1451. The receiving portion 143, the ball member 144, and the plate-shaped member 145 constitute the horizontally-movably-holding mechanism 146, and the horizontally-movably-holding mechanism 146 functions as a rotating mechanism which rotates (Yaw) the first horizontal moving mechanism 40, the second horizontal moving mechanism 50, and the housing 19 about the z axis in the above embodiment.

Plate-shaped members 171 are erected at two positions on an upper surface of the plate-shaped member 145, and a side surface of the housing 19 of the ionization section 10 is fixed to a fixation section 172 of the plate-shaped member 171. This functions as the rotating mechanism 170 which rotates the ionization section 10 about the x axis (Pitch).

While the ionizer 1 of the above embodiment is configured to include six movably-holding mechanisms including three moving mechanisms (the vertical moving mechanism 30, the first horizontal moving mechanism 40, and the second horizontal moving mechanism 50) and three rotating mechanisms (the first rotating mechanism 60, the second rotating mechanism 70, and the third rotating mechanism 80), the ionization section 100 is configured to include only three mechanisms (the vertical moving mechanism 130, the horizontally-movably-holding mechanism 146, and the rotating mechanism 170) as a whole, and the number of movably-holding mechanisms is half that of the above embodiment. For this reason, it is possible to manufacture the ionizer having a smaller size and at lower cost than the ionizer of the above embodiment.

Each of the above embodiments is an example, and can be appropriately changed in accordance with the gist of the present invention.

In the above embodiment, the case in which the attachment surface (ionization section side attachment surface) of the housing 19 of the ionization section 10 of the ionizer 1 and the attachment surface (main body side attachment surface) of the mass spectrometer main body 2 are surfaces in the vertical direction is described as an example. However, both the attachment surfaces are not necessarily in the vertical direction. Further, the description of vertical and horizontal in the above embodiments is not necessarily strictly limited to vertical and horizontal, and the deviation to the extent that the operation described in the above embodiment can be performed may be allowed.

In the above embodiment, the case where both the moving mechanism and the rotating mechanism are provided as the movably-holding mechanism for holding the ionization section 10 of the ionizer 1 is described as an example. However, both the moving mechanism and the rotating mechanism are not necessarily provided. For example, the rotating mechanism may be omitted in a case where the positional accuracy in the rotation direction is not important, and the moving mechanism may be omitted in a case where the position in the movement direction is not important.

In the above embodiment, the ionization section 10 in which the irradiation optical system including the laser light source 11, the reflecting mirror 12, and the condenser lens 13, the sample stage 14, the stage moving mechanism 15, and the microscope 16 are accommodated in the housing 19 is used. However, in a case of an ionizer for a mass spectrometer in which the irradiation position of a sample with the laser light and the observation position are the same, and mass spectrometry of only one point on a sample surface is performed (that is, imaging mass spectrometry is not performed), it is not necessary to include the stage moving mechanism 15. Further, the microscope 16 is also not an essential configuration. Furthermore, the ionization method is not limited to laser ionization, and an ionization section accommodating an ion source which generates ions from a sample by another ionization method can also be configured in a similar manner to that described above.

Further, in the above embodiment, the laser light source 11 is accommodated in the housing 19. However, a configuration in which the laser light source is arranged outside the housing 19 and laser light is transported into the housing 19 by an optical fiber can also be employed. However, when an optical fiber is used, there are a case where it is difficult to condense light to a small diameter and a case where it is difficult to transport light of high energy. For this reason, in particular, in a case where high-resolution imaging mass spectrometry or the like is performed, it is preferable to have a configuration in which the laser light source 11 is accommodated in the housing 19 as in the above embodiment. When the laser light source 11 is accommodated in the housing 19, the housing 19 becomes heavy. However, by attaching a weight which balances with the weight of the housing 19 as in the above embodiment, the housing 19 of the ionization section 10 can be smoothly moved and rotated.

ASPECTS

It is understood by those skilled in the art that a plurality of the embodiments described above are specific examples of aspects below.

First Aspect

A first aspect of the present invention is an ionizer detachably attached to a main body of an ion analyzing device, the ionizer including:

an ionization section including a sample stage and a light irradiation unit configured to irradiate a sample placed on the sample stage with light;

a base body; and a movably-holding mechanism which is provided on the base body and configured to hold the ionization section in a manner movable along or rotatable about one or more axes.

An ionizer according to the first aspect of the present invention includes an ionization section having a sample stage and a light irradiation unit which irradiates a sample placed on the sample stage with light. Further, the ionizer includes a base body and a movably-holding mechanism which is provided on the base body and holds the ionization section movably along or rotatably about one or more axes. Owing to the movably-holding mechanism, the ionization section and the main body of the ion analyzing device can be precisely aligned. Therefore, the ionizer according to the present invention can be attached to the ion analyzing device in a simple manner and with high positional accuracy.

Second Aspect

The ionizer according to a second aspect of the present invention is the ionizer according to the first aspect, in which the movably-holding mechanism includes a moving mechanism configured to hold the ionization section in a manner movable in three directions which are non-parallel to each other and are not on a same plane.

In the ionizer of the second aspect, the ionization section can be attached to the ion analyzing device by moving the ionization section in a manner movable in three directions which are non-parallel to each other and not on the same plane by the movably-holding mechanism.

Third Aspect

The ionizer according to a third aspect of the present invention is the ionizer according to the first aspect or the second aspect, in which the movably-holding mechanism includes a rotating mechanism configured to hold the ionization section in a manner rotatable about two axes non-parallel to each other.

In the ionizer of the third aspect, the ionization section can be attached to the ion analyzing device by rotating the ionization section about two axes non-parallel to each other by the movably-holding mechanism.

Fourth Aspect

The ionizer according to a fourth aspect of the present invention is the ionizer according to any one of the first to third aspects, in which the ionization section further includes a sample stage moving mechanism configured to move the sample stage.

In the ionizer of the fourth aspect, imaging analysis in which ions derived from a sample are analyzed at each of a plurality of different measurement points on a sample surface can be performed.

Fifth Aspect

The ionizer according to a fifth aspect of the present invention is the ionizer according to any of the first to fourth aspects of the present invention, in which the ionization section further includes an observation device configured to observe a surface of the sample.

In the ionizer of the fifth aspect, before a sample is analyzed, a surface of the sample is observed so that a measurement target region is determined, and then the measurement target region can be accurately analyzed.

Sixth Aspect

The ionizer according to a sixth aspect of the present invention is the ionizer according to any of the first to fifth aspects, in which the ionization section has an ionization section side attachment surface attached to the main body, and the movably-holding mechanism includes:

a vertical moving mechanism configured to move the ionization section in a vertical direction;

a rotating mechanism configured to rotate the ionization section about an axis that is parallel to the ionization section side attachment surface and horizontal; and a horizontally-movably-holding mechanism configured to move the ionization section in a horizontal direction.

In the ionizer of the sixth aspect, since only three mechanisms are used to move the ionization section in three directions and rotate the ionization section around two axes, the device can be downsized and manufactured at low cost.

Seventh Aspect

A seventh aspect of the present invention is an ion analyzing device including: the ionizer of any of the first to sixth embodiments; and a main body of the ion analyzing device to which the ionizer is detachably attached, in which the ionization section has an ionization section side attachment surface attachable to the main body, the main body has a main body side attachment surface to which the ionization section is attachable, and three or more protrusions are provided on one of the ionization section side attachment surface and the main body side attachment surface, and grooves for accommodating the three or more protrusions is formed on the other attachment surface.

In the ion analyzing device of the seventh aspect, the ionizer can be attached to the main body of the ion analyzing device with higher accuracy by inserting the protrusion into the groove.

Eighth Aspect

The ion analyzing device according to an eighth aspect of the present invention is the ion analyzing device according to the seventh aspect, in which a second protrusion protruding further than the protrusion is provided at one of a predetermined position on a side of the ionization section side attachment surface in the ionizer and a predetermined position on a side of the main body side attachment surface in the main body, and an insertion port into which the second protrusion is inserted is formed at the other predetermined position.

The predetermined position on the side of the ionization section side attachment surface may be a position in the ionization section side attachment surface, or may be a position on the side of the ionization section side attachment surface of a base body holding the ionization section or the like. Similarly, the predetermined position on the side of the main body side attachment surface may be a position in the main body side attachment surface, or may be a position on the side of the main body side attachment surface of a chamber or a housing of the main body or the like.

In the ion analyzing device of the eighth aspect, the positions of the ionizer and the main body can be roughly adjusted before the second projection is inserted into the insertion port and the ionization section is attached to the main body of the ion analyzing device.

REFERENCE SIGNS LIST

1, 100 . . . Ionizer
10 . . . Ionization Section
11 . . . Laser Light Source
12 . . . Reflecting Mirror
13 . . . Condenser Lens
14 . . . Sample Stage
15 . . . Stage Moving Mechanism
151, 152, 153 . . . Linear Guide
16 . . . Microscope
17 . . . Opening
18 . . . Protrusion
19 . . . Housing
20, 120 . . . Base
125 . . . Lower Base
126 . . . Bar-shaped Member
127 . . . Upper Base
21, 121 . . . Caster
221, 222, 1221, 1222 . . . Plate-shaped Member
23, 123 . . . L-shaped Member
24, 124 . . . Weight

30, 130 . . . Vertical Moving Mechanism
31 . . . Linear Guide
32 . . . Plate-shaped Member
133 . . . Linear Bush
1331 . . . Cylindrical Member
1332 . . . Shaft
134 . . . Plate-shaped Member
40 . . . First Horizontal Moving Mechanism
41 . . . Linear Guide
42 . . . Plate-shaped Member
50 . . . Second Horizontal Moving Mechanism
51 . . . Linear Guide
52 . . . Plate-shaped Member
146 . . . Horizontally-Movably-Holding Mechanism
143 . . . Receiving Portion
144 . . . Ball Member
145 . . . Plate-shaped Member
1451 . . . Recess
60 . . . First Rotating Mechanism
61 . . . Rotary Table
70 . . . Second Rotating Mechanism
170 . . . Rotating Mechanism
71, 171 . . . Plate-shaped Member
72, 172 . . . Fixation Section
80 . . . Third Rotating Mechanism
81 . . . Frame-shaped Member
82 . . . Fixation Section
91, 191 . . . Spring
92, 192 . . . Plate-shaped Member
93, 193 . . . Bar-shaped Member
2 . . . Mass Spectrometer Main Body
94, 194 . . . First Insertion Port
95, 195 . . . Second Insertion Port
96 . . . Ion introduction Unit
97 . . . V-shaped Groove

The invention claimed is:

1. An ionizer detachably attached to a main body of an ion analyzing device, the ionizer comprising:
- an ionization section including a sample stage and a light irradiation unit configured to irradiate a sample placed on the sample stage with light;
- a base body configured to hold the ionization section; and
- a movably-holding mechanism which is provided on the base body and configured to hold the ionization section in a manner movable along or rotatable about one or more axes.

2. The ionizer according to claim 1, wherein the movably-holding mechanism includes a moving mechanism configured to hold the ionization section in a manner movable in three directions that are non-parallel to each other and are not on a same plane.

3. The ionizer according to claim 1, wherein the movably-holding mechanism includes a rotating mechanism configured to hold the ionization section in a manner rotatable about two axes non-parallel to each other.

4. The ionizer according to claim 1, wherein the ionization section further includes a sample stage moving mechanism configured to move the sample stage.

5. The ionizer according to claim 1, wherein the ionization section further includes an observation device configured to observe a surface of the sample.

6. The ionizer according to claim 1, wherein
- the ionization section has an ionization section side attachment surface attachable to the main body, and
- the movably-holding mechanism includes:
- a vertical moving mechanism configured to move the ionization section in a vertical direction;
- a rotating mechanism configured to rotate the ionization section about an axis that is parallel to the ionization section side attachment surface and horizontal; and
- a horizontal movably-holding mechanism configured to move the ionization section in a horizontal direction.

7. An ion analyzing device comprising: the ionizer according to claim 1; and a main body of the ion analyzing device to which the ionizer is detachably attached, wherein
- the ionization section has an ionization section side attachment surface attachable to the main body,
- the main body has a main body side attachment surface to which the ionization section is attachable, and
- three or more protrusions are provided on one of the ionization section side attachment surface and the main body side attachment surface, and grooves for accommodating the three or more protrusions is formed on the other attachment surface.

8. The ion analyzing device according to claim 7, wherein a second protrusion protruding further than the protrusions is provided at one of a predetermined position on the ionization section side attachment surface in the ionizer and a predetermined position on the main body side attachment surface in the main body, and an insertion port into which the second protrusion is inserted is formed at the other predetermined position.

* * * * *